UNITED STATES PATENT OFFICE.

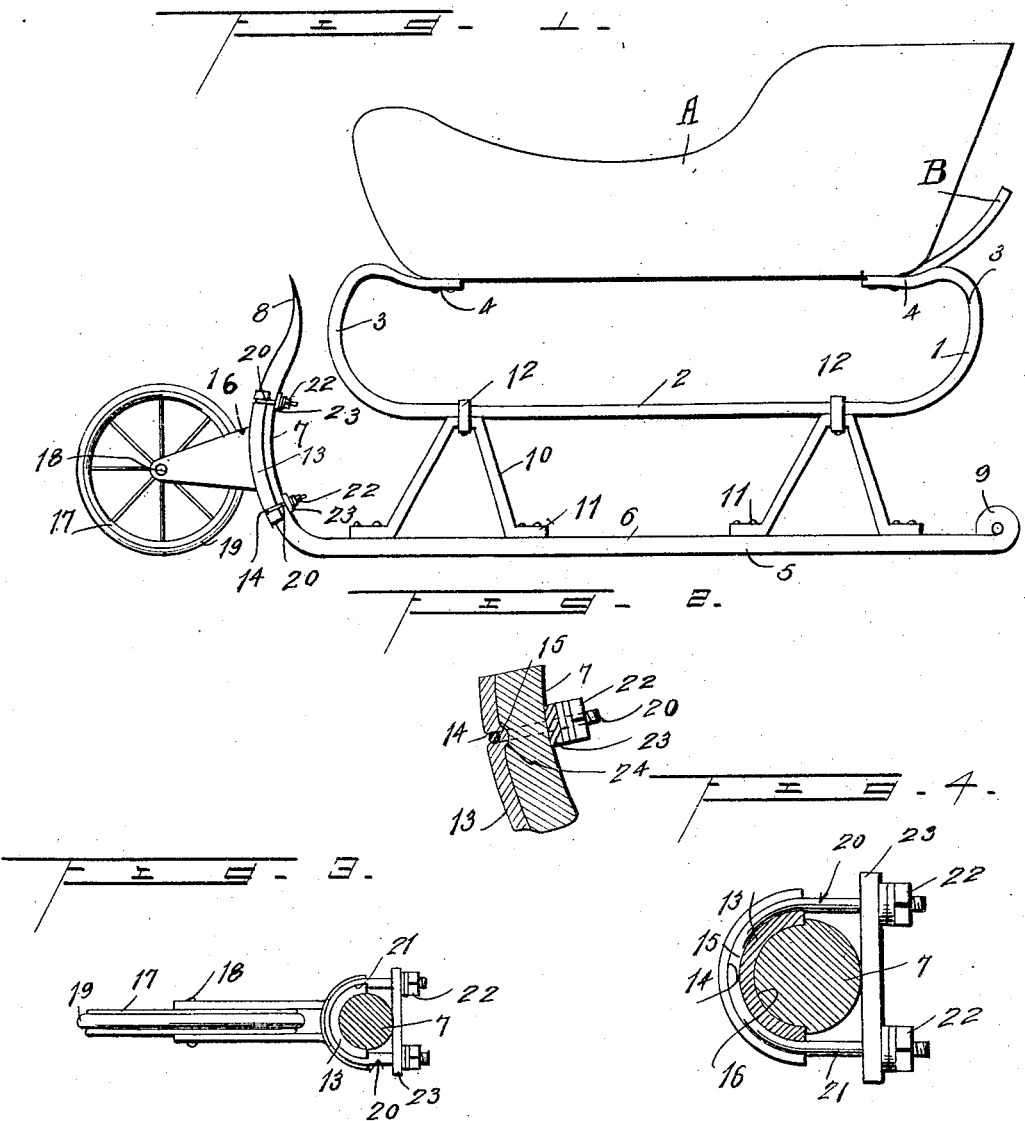

CHARLES R. KUSTER, JR., OF FULTON, NEW YORK.

BABY CUTTER OR SLEIGH ATTACHMENT.

1,234,775.  Specification of Letters Patent.  Patented July 31, 1917.

Application filed March 29, 1917. Serial No. 158,351.

*To all whom it may concern:*

Be it known that I, CHARLES R. KUSTER, Jr., a citizen of the United States, residing at Fulton, in the county of Oswego and State of New York, have invented certain new and useful Improvements in Baby Cutters or Sleigh Attachments; and I do hereby declare the following to be a full, clear, and exact description of the invention, such as will enable others skilled in the art to which it appertains to make and use the same.

This invention relates to a detachable runner or roller adapted to be secured to a sleigh runner, which runner is attached to a baby carriage or cutter.

The object of this invention is the provision of a detachable runner, which may be secured to a baby carriage or the like and has secured to its forward portion, a removable roller which permits the tipping of the carriage or vehicle forward so that the operator may roll the same over bare ground, and when the carriage or vehicle has passed over the bare ground, the carriage or vehicle may be tilted backward so that the runners may engage the ground.

Another object of this invention is the provision of an arcuate bearing member which is substantially concavo-convex in cross section having depending arms in which is rotatably journaled a roller, and this arcuate bearing member is adapted to conform to the upwardly curved portion of the runner and is secured thereto and provided with means to hold it against movement thereon, so as to permit the weight of the carriage to be taken up on the wheels when the same is tilted forward to permit the same to be rolled over bare ground.

A still further object of this invention is the provision of a bearing plate, which carries a roller, and which plate may be detachably and removably secured to the forward portion of a runner, which runner is adapted to be secured to the baby carriage, cutter or the like.

A still further object of this invention is the provision of a device of this character, which shall be simple, practical, and comparatively inexpensive in construction, and one that can be manufactured and sold at a small cost.

With these and other objects in view, the invention consists of the novel combination and arrangement of parts hereinafter more fully described and claimed.

In the drawing:

Figure 1 is a side elevation of a carriage applied to the runners, illustrating the caster or roller secured thereto, Fig. 2 is a fragmentary sectional view taken through the convex portion of the roller, showing the bearing plate as secured thereto, Fig. 3 is a horizontal sectional view illustrating the manner in which the bearing plate and roller are applied to the runner, Fig. 4 is a sectional view of the plate illustrating the manner in which it is secured to the runner.

Like numerals of reference designate corresponding parts in all the figures of the drawing.

Referring more particularly to the drawing, the letter A designates the body of a carriage or the like and has secured thereto, the springs 1, which springs have the horizontal body portions 2, having each of their ends curved upwardly as at 3 and inwardly as at 4 to define attaching portions, which are attached to the under side of the carriage body, as shown in Fig. 1 of the drawing.

A runner designated by the numeral 5 has a horizontal portion 6, the forward end of which is curved upwardly and inwardly as at 7, while its extreme terminal is turned outwardly as at 8. The rear end of the runner is bent back upon itself as at 9. A pair of inverted V-shaped supporting standards 10 are secured to the upper side of the horizontal portion 6 of the runner adjacent the front and rear ends thereof. By bending the leg portions angularly of the bracket in opposite directions, it defines attaching portions to facilitate the securing of the same to the runner. The apex portions of the inverted V-shaped supporting members 10 are secured to the horizontal portions 2 of the springs 1 by suitable bands as shown in Fig. 1.

My improved device provides the roller attachment, which is adapted to be detachably secured to the forward convex portions 7 of the runners 5.

The roller attachment comprises the arcuate plate 13, which is substantially concavo-convex in cross section and is constructed of any suitable metal, suitable for the purpose, and this plate is provided on its convex surface adjacent each of its ends with the transversely arranged grooves 14, which grooves define transversely extending ribs 15, on the concave face of the arcuate member 13 adjacent each end thereof, as shown in Fig. 2.

A pair of spaced laterally extending supporting arms 16 are formed on the convex face of the bearing plate 13 centrally thereof and are substantially V-shaped having their apexes disposed outwardly.

A roller 17 is rotatably mounted between the supporting arms 16 and is journaled therein by bolts 18 extending transversely through the apexes of the arms 16 and the central portion of the roller 17, and the roller may be provided with a tire 19.

The arcuate plate 13 is secured to the convex portions of the runners 5, the concave face of the plate engaging the convex portions 7 of the runners 5, and is detachably secured thereto by the fastening members designated in their entirety by the numeral 20.

The fastening members comprise the U-shaped staples 21 which have their web portions arranged to be fitted in the grooves 14, thus positioning their legs on the opposite sides of the runners 5 and rearwardly beyond the same, the free ends of the staples 21 are screwthreaded and are adapted to receive the nuts 22, and interposed between the nuts and engaging the runners is the double washer plate 23, which washer plate is forced into engagement with the rear side of the runners 5, thus rigidly holding the bearing plate 13 in position on the convex portions 7 of the runners 5.

The convex portions 7 or the upwardly curved portions 7 of the runners 5 are provided on their convex faces with spaced transversely arranged groves 24, which are adapted to receive ribs 15 in the concave face of the plate 13 when secured to the upwardly curved portions of the runners 5, as in Fig. 2 of the drawing.

In assembling the device:

The plate is arranged on the upwardly curved portion 7 of the runner, the ribs 15 resting in the grooves 24 in the runner, the staples arranged to be fitted in the grooves 14 in the convex face of the plate, thus locating the legs on opposite sides and beyond the rear face of the runner, the washer plate 23 is arranged over the legs of the U-shaped staples, the nuts 22 are positioned on the threaded ends of the arms of the legs of the staples, thus binding the plate into engagement with the rear face of the runners, securely and rigidly positioning the plate and roller thereon, thus when the runners engage a bare space on the ground, all that is necessary is to raise up on the handles B of the carriage A, tilting the same forwardly, thus forcing the roller 17 into engagement with the bare ground and lifting the runners free therefrom and pushing the same over the ground until the bare place has been traveled over and the runners can be replaced in engagement with the ground.

What is claimed is:

In combination, a runner, said runner having its forward end curved upwardly and outwardly, the convex face of the upwardly curved portion provided with spaced transversely arranged grooves, an arcuate bearing plate, said plate provided on its convex face with transversely arranged ribs defining interior transversely arranged grooves, said ribs of the plate adapted to engage in the grooves of the runner, laterally extending arms formed from the convex face of the plate, a wheel rotatably mounted in the arms, and fastening means arranged in the grooves of the plate for removably and rigidly supporting the plate and roller to the runner, as and for the purpose specified.

In testimony whereof I affix my signature in presence of two witnesses.

CHARLES R. KUSTER, Jr.

Witnesses:
 MAURICE HILLER,
 C. H. THURSTON.

Copies of this patent may be obtained for five cents each, by addressing the "Commissioner of Patents, Washington, D. C."